Patented Oct. 24, 1922.

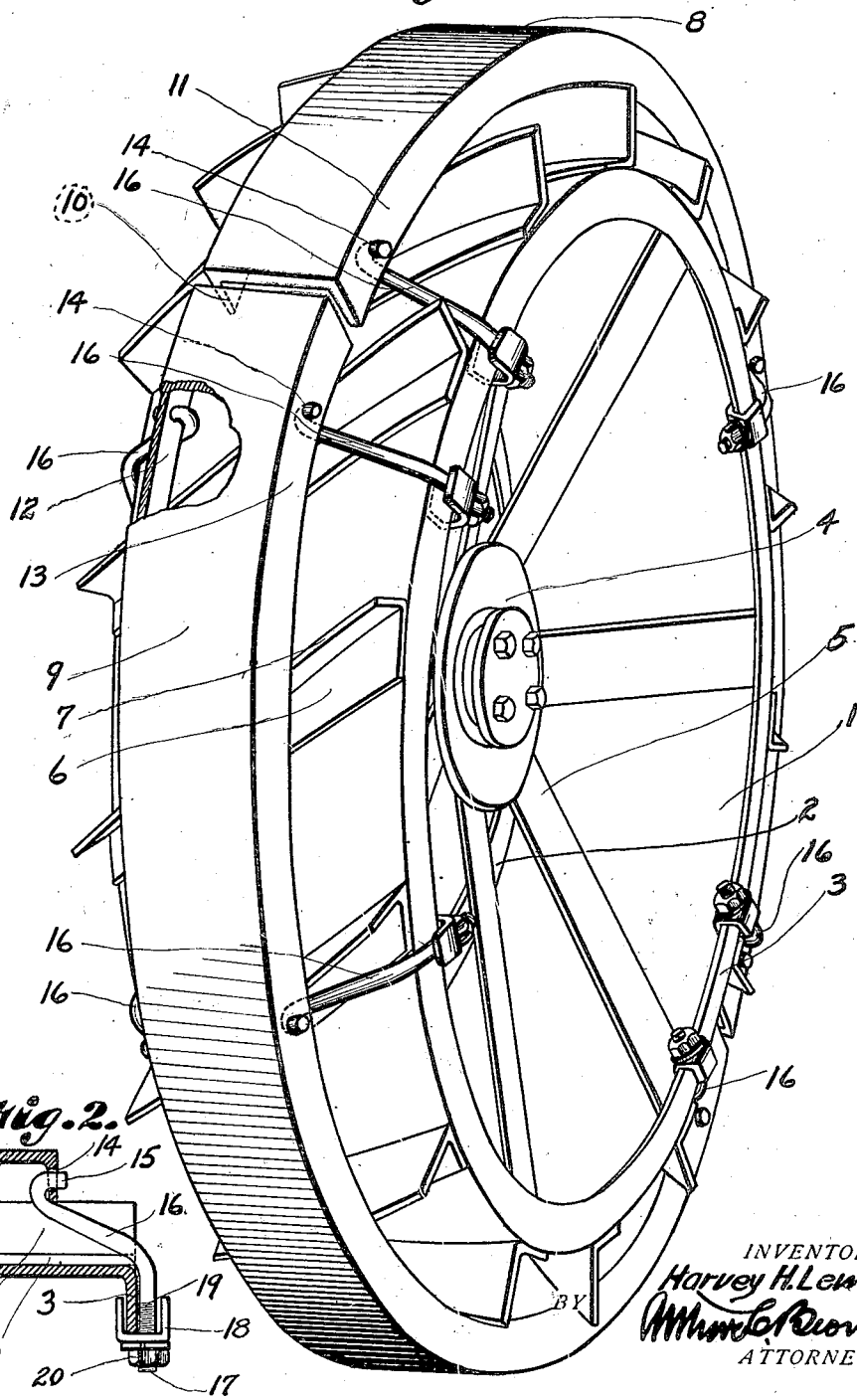

1,432,878

UNITED STATES PATENT OFFICE.

HARVEY H. LEWIS, OF ATCHISON, KANSAS, ASSIGNOR TO HENRY WEIS MANUFACTURING COMPANY, OF ATCHISON, KANSAS, A CORPORATION OF MISSOURI.

SUPPLEMENTAL TIRE.

Application filed July 17, 1922. Serial No. 575,472.

*To all whom it may concern:*

Be it known that I, HARVEY H. LEWIS, a citizen of the United States, residing at Atchison, in the county of Atchison and State of Kansas, have invented certain new and useful Improvements in Supplemental Tires; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a supplemental tire to be applied about the perimeter of a tractor wheel.

Tractor wheels usually are supplied with transverse cleats or shoes which cut into the ground so as to increase traction when the tractor is moving over the field. These cleats or shoes are detrimental to the road surface of the highway as they also cut into, and frequently through, the road surface which is obviously objectionable. Inasmuch as tractor stations are established in towns and cities and the tractor is used on the farm, it is apparent that unless some means is provided for protecting the road from contact with cleats or shoes, the tractors will have to be transported from the distributing depot to the farm by trucks. It is not often convenient to so transport the tractors on account of the distances, etc., and because of lack of conveniences.

My invention contemplates a supplemental wheel tire or guard which may be readily applied to a tractor wheel so as to cover the cleats so that the road will not be cut when the tractor is being driven from its distributing depot to its destination. The novel construction of the invention will be apparent by referring to the following description in connection with the accompanying drawings, in which Fig. 1. is a perspective view of the tractor wheel to which my invention is applied, part of the guard or supplemental tire being broken away to show the manner of fastening the supplemental tire or guard.

Fig. 2. is a fragmentary cross sectional view through the normal tire and the supplemental tire, the fastening means being shown in elevation.

The invention is shown applied to a tractor wheel of conventional design. The tractor wheel is shown as comprising a ring or tire 1, having inturned edge flanges 2 and 3 whereby the ring or tire 1 is in the form of a channel. The ring or tire 1 is connected to an appropriate hub 4 by spokes 5 and across the periphery of the tire are angle-shaped cleats 6, having outstanding edges 7 which bite into the ground when the vehicle is propelled. It is these cleats or shoes which are detrimental to highway surfaces and my invention contemplates means for protecting the roadway from them.

A supplemental tire or guard is shown as comprising two similar circular channel-shaped members 8 and 9, the widths of which are less than the widths of tire 1. The inturned flanges 10 and 11 for the member 8, and 12 and 13 for the member 9 are provided with holes, all of the holes in all of the flanges being designated 14. These holes are adapted to receive the hook shaped ends of the connecting links or coupling members 16 which fasten the members 8 and 9 to tire 1. The members 16 are curved outwardly to the ends 17 distant from the hooks 15. U-shaped jaws are provided which can slide on the shank 19 and receive the flanges 2 and 3. depending upon which side of the wheel the flanges 16 are arranged. When the hook 15 is in an opening 14, a complementary jaw 18 receives the flange (either 2 or 3), the nut 20 on the end 17 can be screwed to draw the members 8 and 9, as the case may be, tight against the edges of the cleats 6, and a direct pull will be exercised on the member 8 or 9 because the shank 19 lies parallel with flange received by the jaw 18 as will be apparent by referring to Fig. 2.

Since the supplemental tire or guard, consisting mainly of the two members 8 and 9 will be of a width less than the width of the tire 1, it will be apparent as the vehicle is being transported over the highway or other surface, the cleats will be guarded but at the expense of traction. Therefore, should the vehicle reach a soft spot, the tire or guard consisting of the members 8 and 9 will sink into the surface, obtain a grip in the earth at the soft spot, and assist the vehicle in moving therefrom. Just as soon as the wheels reach a hard surface, the cleats will be automatically moved from the surface of the highway by the supplemental tire which will then function as a periphery. In actual practice I find that about six connecting links or coupling 16 will suffice for each member 8 and 9, that is twelve connecting links are recommended for a wheel; two at each end of each section 8 and 9 and two at the center, making three on a side. I do not wish to be limited, however, to any particular number of links nor necessarily to the exact details shown.

From the foregoing, it will be apparent, that the supplemental tire guard can be readily attached to and detached from the tractor wheel and that application of the supplemental tire will amply protect the surface of the highway from being cut by a cleat of the wheel.

What I claim and desire to secure by Letters Patent is:

1. The combination with a tractor wheel having transverse cleats on the tire thereof, a ring mounted about the tire and resting upon the cleats to protect the cleats from contact with the ground, links having hooked ends engaging the ring, and an adjustable jaw on each link for engaging the tire to secure the ring rigid with respect to the cleats.

2. In combination, a tractor wheel having a channel-shaped tire, transverse cleats across the periphery of the tire, a ring mounted on the cleats and concentric with the tire, link members connected to the ring, and flange-engaging jaws on the link members, the jaws being engageable with the flanges of the tire.

3. The combination with a tractor wheel having a tire provided with transverse cleats across its periphery, the tire consisting of a channel with flanges bent inwardly, a channel-shaped ring for attachment to the wheel so that the flanges of the ring bear on the cleats, and means for attaching the ring to the flanges of the tire, said means comprising links having hooks at one end for engagement with openings in the flanges of the rings, and adjustable, U-shaped flange-engaging members at the other end for engaging the flange of the tire on the wheel, the links, when in place, being radially disposed with respect to the wheel.

In testimony whereof I affix my signature.

HARVEY H. LEWIS.